(12) United States Patent
Ramappa et al.

(10) Patent No.: US 11,306,414 B2
(45) Date of Patent: Apr. 19, 2022

(54) ARTICLES WITH IMPROVED FLAME RETARDANCY AND/OR MELT DRIPPING PROPERTIES

(71) Applicant: QED LABS INC., Waltham, MA (US)

(72) Inventors: Deepak Arabagatte Ramappa, Somerville, MA (US); Gangadhar Jogikalmath, Chestnut Hill, MA (US)

(73) Assignee: QED Labs Inc., Waltham, MA (US)

( * ) Notice: Subject to any disclaimer, the term of this patent is extended or adjusted under 35 U.S.C. 154(b) by 0 days.

(21) Appl. No.: 15/111,320

(22) PCT Filed: Jan. 16, 2015

(86) PCT No.: PCT/US2015/011676
§ 371 (c)(1),
(2) Date: Jul. 13, 2016

(87) PCT Pub. No.: WO2015/109135
PCT Pub. Date: Jul. 23, 2015

(65) Prior Publication Data
US 2016/0348279 A1    Dec. 1, 2016

Related U.S. Application Data

(60) Provisional application No. 62/068,189, filed on Oct. 24, 2014, provisional application No. 61/928,503, filed on Jan. 17, 2014.

(51) Int. Cl.
| | | |
|---|---|---|
| *D01F 1/07* | (2006.01) | |
| *D01F 6/60* | (2006.01) | |
| *D01F 6/62* | (2006.01) | |
| *D01F 1/10* | (2006.01) | |
| *C08L 51/00* | (2006.01) | |
| *B82Y 30/00* | (2011.01) | |
| *D03D 15/00* | (2021.01) | |
| *C08K 9/04* | (2006.01) | |
| *C09K 21/14* | (2006.01) | |
| *C08K 5/51* | (2006.01) | |
| *C08K 3/04* | (2006.01) | |

(52) U.S. Cl.
CPC ............... *D01F 1/07* (2013.01); *B82Y 30/00* (2013.01); *C08K 9/04* (2013.01); *C08L 51/00* (2013.01); *C09K 21/14* (2013.01); *D01F 1/10* (2013.01); *D01F 6/60* (2013.01); *D01F 6/62* (2013.01); *D03D 15/00* (2013.01); *C08K 3/042* (2017.05); *C08K 5/51* (2013.01); *D10B 2331/021* (2013.01)

(58) Field of Classification Search
CPC ..... D01F 1/07; D01F 1/10; D01F 6/60; D01F 6/62; B82Y 30/00; C08L 51/00; D03D 15/00; C08K 9/04; C08K 2201/011; C08K 3/042; C09K 21/14; D02G 3/38; D01B 2331/021
See application file for complete search history.

(56) References Cited

U.S. PATENT DOCUMENTS

| | | | |
|---|---|---|---|
| 3,874,155 A | | 4/1975 | Knopka |
| 4,147,741 A | * | 4/1979 | Slama ...................... C08K 5/17 260/DIG. 24 |
| 4,243,713 A | | 1/1981 | Worrall et al. |
| 4,298,509 A | | 11/1981 | Fochesato |
| 4,400,490 A | * | 8/1983 | Yang ...................... C08G 69/18 264/240 |
| 5,317,051 A | | 5/1994 | Harashige et al. |
| 5,438,084 A | * | 8/1995 | Imahashi ................. C08K 3/02 523/440 |
| 6,291,627 B1 | | 9/2001 | Wang et al. |
| 10,183,465 B1 | * | 1/2019 | Bowman ............... H01L 33/382 |
| 2002/0035233 A1 | | 3/2002 | Wang et al. |
| 2002/0124544 A1 | | 9/2002 | Land et al. |
| 2003/0166785 A1 | | 9/2003 | Medsker et al. |
| 2005/0014875 A1 | | 1/2005 | Knop et al. |
| 2005/0239975 A1 | * | 10/2005 | Gan ........................ C08J 9/0038 525/525 |
| 2006/0014461 A1 | | 1/2006 | Bansal et al. |
| 2006/0035555 A1 | | 2/2006 | Narayanan et al. |
| 2006/0141890 A1 | | 6/2006 | Link et al. |
| 2006/0223921 A1 | | 10/2006 | Bauer et al. |
| 2007/0176155 A1 | | 8/2007 | Granada, Jr. et al. |
| 2007/0212963 A1 | * | 9/2007 | Keep ...................... B32B 27/306 442/136 |
| 2010/0009586 A1 | | 1/2010 | Verdu et al. |
| 2010/0075557 A1 | | 3/2010 | Shteiyer |
| 2010/0181696 A1 | | 7/2010 | Glauner et al. |
| 2010/0234495 A1 | | 9/2010 | Roth |

(Continued)

FOREIGN PATENT DOCUMENTS

| | | |
|---|---|---|
| CA | 2511187 C | 10/2011 |
| CN | 1293695 A | 5/2001 |

(Continued)

OTHER PUBLICATIONS

Dong, et al., Improvement of thermal stability of polypropylene using DOPO-immobilized silica nanoparticles, Colloid and Polymer Science, vol. 290, No. 14, pp. 1371-1380. May 3, 2012.
Ying Ling Liu et al., Flame-Retardant Epoxy Resins from o-Cresol Novolac Epoxy Cured with a Phosphorus-Containing Aralkyl Novolac, Journal of Polymer Science Part A: Polymer Chemistry, Jun. 5, 2002, vol. 40, No. 14, pp. 2329-2339. Jun. 5, 2002.
Adur, Ashok M. et al., "using ZeMac copolymers to upgrade virgin nylon performance", Vertellus specialities Inc., USA.

(Continued)

*Primary Examiner* — Amina S Khan
(74) *Attorney, Agent, or Firm* — Hodgson Russ LLP

(57) ABSTRACT

Compositions and articles with improved flame properties and fabric with improved melt dripping properties is disclosed. Reduced melt dripping can prevent injuries. Methods for making and using such compositions, articles and fabric are disclosed.

1 Claim, 10 Drawing Sheets

(56) References Cited

U.S. PATENT DOCUMENTS

| | | | |
|---|---|---|---|
| 2012/0071585 A1* | 3/2012 | Nohara | C08G 59/304 523/433 |
| 2012/0108710 A1 | 5/2012 | Schweigk et al. | |
| 2012/0157589 A1* | 6/2012 | Roth | C08K 5/34928 524/101 |
| 2012/0164373 A1* | 6/2012 | Spencer | C08G 59/1488 428/116 |
| 2012/0296029 A1 | 11/2012 | Liu et al. | |
| 2013/0018128 A1* | 1/2013 | Yao | C07F 9/65717 523/451 |
| 2013/0161064 A1 | 6/2013 | Shimada et al. | |
| 2013/0244527 A1 | 9/2013 | Sarzotti et al. | |
| 2013/0258467 A1 | 10/2013 | Shiraiwa et al. | |

FOREIGN PATENT DOCUMENTS

| | | |
|---|---|---|
| CN | 1659217 A | 8/2005 |
| CN | 101287797 A | 10/2008 |
| CN | 101743266 A | 6/2010 |
| CN | 102372900 A | 3/2012 |
| CN | 102504197 A | 6/2012 |
| CN | 102575031 A | 7/2012 |
| CN | 102875982 A | 1/2013 |
| CN | 102971333 A | 3/2013 |
| CN | 103073749 A | 5/2013 |
| CN | 103073749 A | 5/2013 |
| CN | 103328558 A | 9/2013 |
| EP | 1544227 A1 | 6/2005 |
| JP | 2007191521 A | 8/2007 |
| JP | 2007231091 A | 9/2007 |
| WO | WO-2005-047358 A1 | 5/2005 |
| WO | 2011015611 A1 | 2/2011 |
| WO | 2013074181 A2 | 5/2013 |
| WO | 2013165425 A1 | 11/2013 |
| WO | 2014008330 A1 | 1/2014 |

OTHER PUBLICATIONS

Frenz, Volker, et al. "Multifunctional polymers as chain extenders and compatibilizers for polycondensates and biopolymers", ANTEC 2008, pp. 1682-1686, SPE.

Liao et al., "One-Step Reduction and Functionalization of Graphene Oxide with Phosphorus-Based Compound to Produce Flame-Retardant Epoxy Nanocomposite", Industrial and Engineering Chemistry research, Mar. 5, 2012, pp. 4573-4581, vol. 51, Issue 12, ACS Publications.

CNIPA, Office Action for CN Application No. 201811189164.8, dated Nov. 24, 2021.

* cited by examiner

ARTICLES WITH IMPROVED FLAME RETARDANCY AND/OR MELT DRIPPING PROPERTIES

CROSS-REFERENCE TO RELATED APPLICATIONS

This application is a National Stage Application filed under 35 U.S.C. 371 of International Application No. PCT/US2015/011676, filed Jan. 16, 2015, which claims the benefit of U.S. Application No. 61/928, filed Jan. 17, 2014 and U.S. Application No. 62/068,189 filed Oct. 24, 2014, the contents of which are incorporated herein by reference in their entireties.

FIELD OF THE DISCLOSURE

The present disclosure relates to compositions, articles, and methods providing flame and fire protection, including fabrics with improved melt dripping properties.

BACKGROUND OF THE DISCLOSURE

Flame retardancy and voidance of melt dripping are two important properties in articles such as fabrics. Flame retardants are chemicals that resist the spread of fire and are used in, for example, thermoplastics, textiles, and coatings. Typically, flame retardants are halogenated (i.e., brominated) or phosphate based. However, these flame retardant and fire protection materials are generally inefficient or have negative impacts on the environment. For example, halogenated flame retardants, such as brominated flame retardants, are persistent, bio-accumulative, and toxic to both humans and the environment. Brominated flame retardants are suspected of causing negative neurobehavioral effects and endocrine disruption. Brominated flame retardants also release toxic gases which can cause more deaths than fire itself.

Non-halogenated flame retardants, such as phosphate based flame retardants, are generally non-toxic and environmentally friendly. However, phosphate based flame retardants tend to be less efficient. Generally, theses phosphate based flame retardants require high loading (i.e. doses/volumes) which reduces efficacy. Such high doses may compromise the mechanical properties, thereby increasing susceptibility to failure, of fabrics and other materials to which the phosphate based flame retardants are applied. Phosphate flame retardants also tend to leach out of the materials to the surface rendering the material vulnerable to fire.

Non-halogenated flame retardant additives currently used in the market are less efficient than halogenated flame retardants. For example, polymers may contain between 30% and 60% of phosphorus based flame retardant substances where only 15% of halogenated flame retardants may be sufficient. This higher percentage can compromise the structural integrity of the article and cause the properties of the final product to deteriorate.

Melt dripping of plastics or fabrics when exposed to flame or fire is also undesirable. Melt drips on the skin of a wearer can cause grievous bodily injury because a hot, sticky, melted substance formed from the plastic or fabric can cause localized and extremely severe burns. For example, the polyamide (such as nylon-6 and nylon-6,6) uniforms for defense personnel show undesirable melt dripping problems when exposed to flame.

Therefore, it is desirable to have fibers and fabrics and other articles that show improved flame retardancy and that are capable of lowered melt dripping when exposed to flame.

BRIEF SUMMARY OF THE DISCLOSURE

The above objects are met by the compounds, articles, and methods disclosed herein.

A composition is provided in a first aspect. The composition includes a first polymer and a second polymer. The first polymer is functionalized with a first functional group. The second polymer is functionalized with a second functional group different from and complementary to the first functional group. The first polymer and second polymer form a third polymer via crosslinking upon exposure to a flame. This third polymer may have a higher molecular weight than either the first polymer or the second polymer. These first and second polymers may form a fabric.

The first functional group and second functional group may be reactive pairs such as amine and acids, amine and epoxide, amine and anhydride, amine and isocyanate, amine and aldehyde, amine and alkyl halide, amine and alkyl sulfonate, amine and thiol, epoxide and anhydride, epoxide and hydroxyl, or epoxide and acid. In one example, the first functional group is an epoxy and the second functional group is a hydroxyl or amine.

The first functional group or second functional group may include a flame retardant, such as a phosphorus compound.

In some embodiments, at least one of the first polymer or second polymer may be a polyolefin that includes a water-releasing additive.

In certain embodiments, at least one of the first polymer or the second polymer may have a lower melting point than the other and contains a reactive crosslinker, such as an epoxy modified 9,10-dihydro-9-oxy-10-phospha-phenanthrene-10-oxide (DOPO).

A fabric is provided in a second aspect. The fabric has a plurality of first fibers and a plurality of second fibers. The first fibers include a first polymer functionalized with a first functional group. The second fibers include a second polymer functionalized with a second functional group different from and complementary to the first functional group. The first polymer and second polymer form a third polymer via crosslinking upon exposure to flame. In some embodiments, this fabric may be woven.

The first and second fibers may be different. For example, the first fibers can be polyethylene terephthalate (PET) and the second fibers can be nylon. The first and second fibers also may be the same. For example, the first and second fibers can be nylon. Nylon-6 and nylon-6,6 are commonly used nylons but other nylons may be utilized.

In some embodiments, the first functional group and second functional group may be pairs such as amine and acids, amine and epoxide, amine and anhydride, amine and isocyanate, amine and aldehyde, amine and alkyl halide, amine and alkyl sulfonate, amine and thiol, epoxide and anhydride, epoxide and hydroxyl, or epoxide and acid.

In certain embodiments, the first fibers may be spiral wound on the second fibers. The first fibers also may be woven in the same or an orthogonal direction to the second fibers. In other embodiments, the first and second fibers also can form a bicomponent fiber.

The fabric may include a plurality of third fibers. For example, the third fibers can be at least one of cotton, rayon, wool, hair, silk, and aramid (such as Kevlar®). These third fibers may have a higher melting temperature than either the first fibers or the second fibers.

The fabric also may include a plurality of metallic fibers or a plurality of functionalized nanoparticles. In an example, the first fibers include nylon and silica nanoparticles functionalized with a hydroxyl functional group and the second fibers include nylon and silicon nanoparticles functionalized with an epoxy functional group In some embodiments, the first functional group or second functional group may include a flame retardant, such as a phosphorus compound.

In certain embodiments, at least one of the first polymer or second polymer may be a polyolefin that includes a water-releasing additive.

In yet other embodiments, at least one of the first polymer or the second polymer may have a lower melting point than the other and contains a reactive crosslinker, such as an epoxy modified 9,10-dihydro-9-oxy-10-phospha-phenanthrene-10-oxide (DOPO).

The first fibers and the second fibers may contain chemical pairs that produce foam when combined. The foam can serve to reduce flame propagation and melt dripping.

A method of weaving is provided in a third aspect. A plurality of first fibers of a first polymer functionalized with a first functional group and a plurality of second fibers of a second polymer functionalized with a second functional group different from and complementary to the first functional group are provided. The first polymer and the second polymer are configured to form a third polymer via crosslinking upon exposure to flame. The first fibers and second fibers are woven to form a fabric.

The first fibers may be spiral wound on the second fibers. The first fibers also may be woven in the same or an orthogonal direction to the second fibers. The first and second fibers also can form a bicomponent fiber.

A plurality of third fibers may be woven into the fabric. For example, the third fibers can be at least one of cotton, rayon, wool, hair, silk, and aramid (such as Kevlar®). These third fibers may have a higher melting temperature than either the first fibers or the second fibers.

A plurality of metallic fibers may be woven into the fabric or a plurality of functionalized nanoparticles can be added into the fabric.

Benign and non-toxic flame retardants are provided as a fourth embodiment. Flame retardant molecules or particles may be anchored to a polymer matrix of an article or finished product, and are stably and uniformly distributed therein. The anchoring the flame retardant molecules to the polymer matrix reduces the risk of the flame retardant molecules leaching and blooming to the surface of the article. This interlocking or anchoring of flame retardant molecules also helps offset the loss in mechanical properties of the finished polymer product when the flame retardants are used in excess to achieve a fire resistance rating. The advantage of attaching anchors to flame retardant molecules is that this allows the anchored flame retardants to be mixed with a polymer matrix, even when the melting points of the flame retardant and the polymer matrix are substantially different. As long as the anchor molecules are capable of melting, mixing, and integrating with the polymer matrix during mixing, the flame retardant molecule is carried along and is distributed within the matrix.

In some embodiments, anchors are attached to the flame retardant molecules via either covalent, electrostatic or van der Waals interactions prior to addition into the polymer matrix. In other embodiments, the flame retardants may be reacted or bound to an anchor during the processing of adding the flame retardant to the polymer article. In these embodiments, both the anchor and the flame retardants may be separately added during processing of the polymer into a final article.

The anchors may be tuned to the chemical environment of the polymer article. For example, the anchors may have a substantially similar chemical structure as that of the polymer matrix and/or be compatible with the polymer. The anchor and flame retardant combination conjugate may be a separate entity from the polymer allowing the final product to be easily recycled. This also allows a new product produced from the recycled product to maintain the flame retardants and possess the flame retardant properties of the original article.

Flame retardant articles are disclosed as a fifth aspect. The flame retardant article may include a phosphate based flame retardant chemically joined to a reactive functional group of an anchor molecule forming a conjugate, wherein the conjugate is dispersed in the polymer matrix.

The phosphate based flame retardant may be at least one of red phosphorous, ammonium polyphosphate, Trischloropropyl phosphate (TCCP), DOPO (9,10-Dihydro-9-oxa-10-phosphaphenanthrene-10-oxide), and Fyrol PMP (1,3,-Phenylene methylphosphonate). The anchor may be an amine modified or anhydride modified polymer having at least one of an epoxy functional group, a hydroxyl functional group, an anhydride functional group, a carboxyl functional group, a sulfhydryl functional group, an ester functional group, or an ether functional group, etc. Alternatively, the anchor may be a nanoparticle, such as exfoliated graphite, graphene, and graphene oxide. The anchor may also include a macromolecule chemically joined to a surface of the nanoparticle.

Methods of making flame retardant articles are disclosed as a sixth aspect. The method may include reacting a phosphate based flame retardant with a reactive functional group of an anchor molecule forming a modified flame retardant, and mixing the modified flame retardant with a polymer matrix. The reacting step may further include reacting the phosphate based flame retardant with at least one of an epoxy functional group, a hydroxyl functional group, an anhydride functional group, a carboxyl functional group, a sulfhydryl functional group, an ester functional group, or an ether functional group of the anchor molecule. The mixing step may further include adding the modified flame retardant to a continuous phase polymer.

In some embodiments, the method may include reacting a phosphate based flame retardant with a reactive functional group of a nanoparticle forming a modified flame retardant, and mixing the modified flame retardant with a polymer matrix. The reacting step may include reacting the phosphate based flame retardant with at least one of a exfoliated graphite, graphene, and graphene oxide nanoparticle. The reacting step may further include reacting the nanoparticle with a macromolecule to produce the modified flame retardant. The reacting step may further include dispersing the modified flame retardant in a hydrophobic polymer matrix.

In a further aspect, the invention concerns modified flame retardant comprising a reaction product of a phosphate based flame retardant with a reactive functional group of an anchor molecule. In some embodiments, the anchor molecule comprises a nanoparticle.

Other aspects can be derived from the instant disclosure.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts.

DETAILED DESCRIPTION OF THE DISCLOSURE

Figure 1:
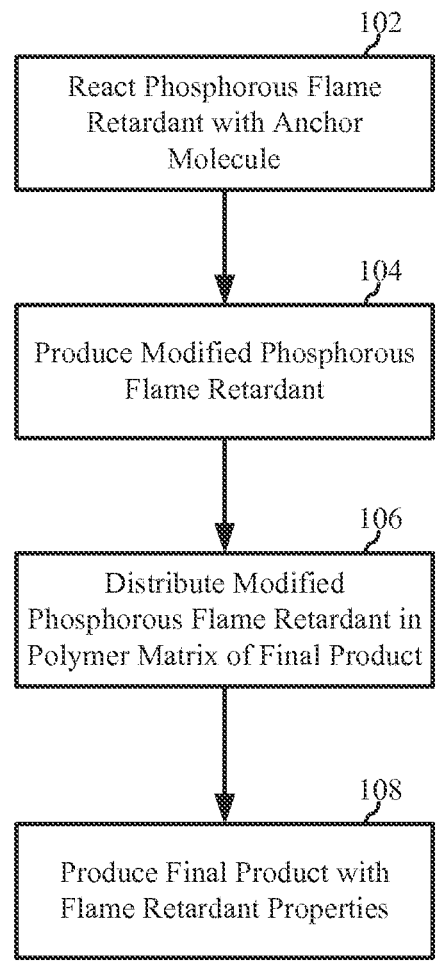
FIG. 1 illustrates a method of anchoring flame retardant molecules to a polymer matrix.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using the compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

In general, when a range is presented, all combinations of that range are disclosed. For example, 1 to 4 includes not only 1 to 4 but also 1 to 2, 1 to 3, 2 to 3, 2 to 4 and 3 to 4.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Melt dripping and flammability of articles such as fabrics when exposed to flame can be problematic. For example, fabrics made of polyethylene terephthalate (PET) and nylon can melt drip when aflame and cause grievous injuries to people wearing them. Though flame retardant systems are used in PET and in nylon, none of them have been able to successfully reduce or stop melt dripping. Described here are embodiments that can be used to reduce or eliminate melt drips when fabrics or articles made of PET and nylon and other polymeric materials encounter flame.

In one embodiment, crosslinking of a reactive component added to the fiber spinning melt is encouraged to form an interpenetrating network with the nylon matrix. The crosslinking enhances the viscosity of the material when aflame, potentially reducing the melt drips.

In one embodiment, Elvamide® nylon multipolymers from DuPont are added as an additive to the nylon melt during fiber spinning. An epoxy crosslinker such as diglycidyl ether of polyethyleneoxide is used to crosslink the Elvamide® molecules. In another embodiment, epoxy modified DOPO flame retardant molecules from Struktol can be used to modify some of the amines thereby imparting further flame retardancy and an ability for char formation. The DOPO may be a surface modifying additive used with an anchor. This embodiment is not limited to nylons but can also be applied to other thermoplastic fibers such as PET by selecting appropriate reactive molecules. With Elvamide® (a nylon resin sold by DuPont) or similar nylon polymers that contain COOH and $NH_2$ functionalities, multifunctional crosslinkers (that may contain at least two functional groups) that may contain epoxy, anhydride, amine, isocyanate, or hydroxyl can be used to create crosslinked networks. Other groups or species also may be contained in the crosslinker and the crosslinkers are not limited merely to those examples herein.

In another embodiment, crosslinking can be brought about between merging melt fronts such as those encountered in bicomponent fibers. These fibers are made by mixing two dissimilar materials in the spinneret head to create fibers with two different materials joined together in many different shapes. This technique can be exploited to create cross-linked fibers. In one example, two streams of Nylon polymer melts, one containing an Elvamide® nylon resin and the other containing a bifunctional crosslinker such as diglycidyl ether of PEG are brought together a bicomponent fiber, both made of PET. When the melt fronts meet, the reactive molecules react with one another forming crosslinks where the melt fronts meet resulting in enhanced resistance to melt dripping in the case of a fire.

The techniques and embodiments discussed here are not only applicable to melts but also to solvent phase processes such as fiber spinning from a "dope" (polymer solution), membrane and hollow fiber production from polymer precipitation or other processes.

We have found that melt dripping in articles such as fabrics can be reduced or eliminated by creating a high molecular weight polymer via a crosslinking mechanism during exposure to flame. This high molecular weight polymeric structure would have low melt viscosities and, hence, a lowered chance of dripping molten drops of polymer when exposed to flame. The fibers and fabrics could further be modified with flame retardants so that they show self-extinguishing behavior when exposed to flame.

The unfunctionalized polymers may have a molecular weight from about 2,000 to about 200,000, including all values and ranges there between. Upon exposure to flame, the molecular weight of the high molecular weight polymeric structure may be from about 50,000 to about 2,000,000, including all values and ranges there between. However, a cross-linked system may be considered as having an infinite molecular weight instead of a finite molecular weight.

In an example, the high molecular weight polymeric structure has a melt viscosity from about 50 cps to about 20,000 cps, including all values and ranges there between. Viscosity increases with molecular weight. If all the polymer chains are connected via crosslinking, then the material will cease to be a thermoplastic that is capable of melting. Instead, the material turns into a thermoset that will char on exposure to flame instead of melting.

Embodiments disclosed herein can apply to synthetic fibers such as nylons (polyamides), polyesters (both biodegradable and non-biodegradable), polyolefins (e.g., polypropylene, polyethylene), or styrene-based polymers (such as polystyrene and its copolymers). Embodiments disclosed herein also can apply to elastomeric fibers, such as those from natural or synthetic rubbers. Embodiments disclosed herein also can apply to natural fibers such as those from animals such as silk, wool fibers, or animal hair. Embodiments disclosed herein also can apply to aromatic fibers (such as Kevlar® aramid and Nomex® aramid which are marketed by E.I. du Pont de Nemours and Company), or polyurethane fibers (such as Lycra® spandex which is marketed by Invista). Embodiments disclosed herein also can apply to biodegradable fibers such as PLA (polylactic acid), fibers derived from proteins, fibers that are of plant origin such as hemp, jute, rayon, cotton fibers, or blends of cottons and synthetic fibers. Of course, embodiments disclosed herein can apply to other fibers not specifically listed.

Crosslinking can be brought about during fiber production by mixing two polymers containing complementary functional groups capable of reacting with each other. Crosslinking occurs when the produced polymer articles/fabrics are exposed to flame. The crosslinking can be initiated at temperatures as low as about 120° C. when polyolefins are involved or as up to approximately about 350° C. to about 400° C. when high temperature polymers are involved. Temperatures ranges to initiate crosslinking can be between about 110° C. to about 450° C., including all values and ranges there between, or from about 150° C. to about 350° C.

A catalyst may be used to accelerate the reaction between complementary functional groups. In one such example, a fiber may contain excess of anhydride groups in one fiber and epoxy groups in the other fiber with an accelerator such as Imicure (manufactured by Air Products and Chemicals, Inc.).

Complementary functional groups include, but are not limited to, amine and acids, amine and epoxide, amine and anhydride, amine and isocyanate, amine and aldehyde, amine and alkyl halide, amine and alkyl sulfonate, amine and thiol, epoxide and anhydride, epoxide and hydroxyl, epoxide and acid, or other combinations that affect melt dripping.

In an embodiment, a fabric is constructed using an alternate pattern of two different fibers. One has a polymer additive with functional group A (such as epoxy groups) and the other has a polymer additive with a functional group B (such as hydroxyls) on the surface (via grafting or topical treatment) or in the bulk (added during melt blending and processing). When such a fabric or other article is exposed to flame, the functional groups A and B react with each other in the heat elevating the molecular weight of the polymer network in the fiber immediately. This increased molecular weight will, in turn, increase viscosity thereby reducing melt drip.

Some of the functional groups are expected to be present at the surface of the fibers to enhance the melt viscosity at the interfaces of the melt fronts. As a flame event results in sudden elevation of temperatures, the fibers are expected be in a melt state almost instantaneously. This results in melting and comingling of the different polymer fibers resulting in facile reaction between the functional groups in individual fibers and leading to increased melt viscosity. Thus, the depth at which the functional groups are located in a fiber can affect melt dripping properties. This depth can be adjusted to affect melt dripping properties.

For a completely cross-linked system, the ratio of the functional groups A and B may be about 1:1. However, the ratio can be chosen such that more than about 10% of the A groups can react with B groups resulting in an increased molecular weight. In an example, about 20% to about 80% of the A groups reacted with corresponding B groups resulting in increased melt viscosity.

In another embodiment, a fiber of the same material or a different material can be cowoven to produce a flame retardant fiber. In an example, a polyethylene terephthalate (PET) fiber, which is carrying an additive such as a multi-functional epoxy compound, can be co-woven with a nylon fiber carrying either a multi-functional amine additive (such as a polyamine) or a polyhydroxy compound with a suitable catalyst, melt-blended into the nylon fiber. When such fibers come together and are exposed to flame/heat, they melt and fuse and the complementary functional groups react to create interpenetrating networks thereby increasing melt viscosity of the combined fiber mass and reducing the dripping characteristics of the fabric.

In another embodiment, one of the fibers containing complimentary functional groups is spiral wound on top of another fiber containing a complementary functional group capable of reacting with the first fiber. Thus when exposed to flame, both fibers fuse together generating interfacial crosslinks capable of reducing melt viscosity.

In another embodiment, two fibers are the same material with different functional groups. For example, a nylon fiber which has an additive such as a multiamine polymer can be co-woven with another nylon fiber containing a polyepoxy compound or a polyanhydride compound.

In another embodiment, the woven fibers could be in the same direction (warp) or in orthogonal direction (weft). This enables the fibers to fuse along their length (warp) or at junction points when they are woven orthogonal to each other (weft).

In another embodiment, a third neutral fiber that does not melt (such as cotton or rayon) can be added as a minority component of the fabric during weaving process. The third fiber can act as scaffolding around which functionalized fibers can melt and form a high viscosity front against a flame front. The third fiber has a higher melting temperature than either the first or second fibers. Other examples of this third fiber include wool, hair, silk, or aramid (such Kevlar®, or Nomex®).

In another embodiment, metallic fibers are interwoven to act as heat sinks such that heat from the flame area can be carried to a distant location where melt fusing of the functional fibers could occur, thus preventing further propagation of the flame front. These metallic fibers may be copper, ferrous materials (such as steel wool), gold, silver, nickel, manganese, aluminum, or other metals or alloys that can act as heat sinks.

In another embodiment, the multi-functional additives could themselves contain flame retardant entities such as phosphates or phosphonates (e.g., an epoxy-containing phosphorus compound) which help form char on the surface exposed to flame, thus helping self-extinguish burning articles.

In another embodiment, chemical pairs that produce foam when combined can be added to neighboring fibers such that upon melting and fusing, the gas forming or foam-forming components come together and form foam within the molten fibers of the matrix making them insulating and preventing flame front propagation and dripping. In an example, sodium bicarbonate is impregnated in one fiber and an acid (such as citric acid) is impregnated in the second fiber. When the fibers come together, the reaction leads to evolution of $CO_2$. In another example, isocyanate is impregnated in one fiber and a water-releasing flame retardant (such as aluminum hydroxide (ATH)) is impregnated in the second fiber. When the water of hydration is released, isocyanate may react with water and release $CO_2$. Other chemical pairs also can produce foam when combined and these are merely examples.

In another embodiment, the two complimentary fibers or three complementary fiber/inert fiber combination (two complimentary fibers along with one or more inert fibers) can be converted into fabric using weaving techniques or knitting techniques. In an example, the three fiber combination fabric is made by using functionalized-polyester, functionalized-nylon, and a metallic fiber or functionalized-polyester, functionalized-nylon, and a polypropylene fiber.

Complimentary fibers are those that have reactive groups which can react to link the fibers. Inert fibers are substantially devoid of such reactive groups.

In another embodiment, a water releasing additive (such as ATH) can be added to a fiber made of polyolefin. As the ATH decomposition temperature is lower than the processing temperature of nylon or PET, it may only be used with lower melting polymers such as polyolefins. When such ATH-containing fibers (e.g., polyolefins) are co-woven with either nylon or PET, the ATH-containing fibers provide a source of water during flame propagation thereby quenching the fire and reducing the heat. Borate and zinc oxide based flame retardants, magnesium hydroxide, magnesium hydroxide sulfate hydrate, magnesium carbonate subhydrate, calcium hydroxide, calcium sulfate dehydrate, and magnesium phosphate octahydrate are examples of materials that also can provide a source of water during flame propagation. Depending on the application and other flame retardants used, the added range of water releasing additive could be from 1 PHR to 75 PHR, including all values and ranges there between. PHR denotes parts per hundred.

In another embodiment, a nitrogen-containing synergist such as melamine can be melt blended in one fiber and a molecule containing epoxy groups in the other fiber. This nitrogen-containing synergist is an additive in a fiber that contains nitrogen. When these two fibers melt and fuse in the presence of a flame, a reaction is initiated between melamine and epoxy thereby creating a cross-linked network that behaves like a thermoset. As the melting temperature of melamine is 350° C., no reaction is expected to occur with melamine during the traditional processing temperatures used for producing nylon or PET fibers (<300° C.). This network should reduce melt dripping and help self-extinguish the flame. In another embodiment the melamine additive could be used in conjunction with an additive containing phosphorus, as the nitrogen containing molecules synergistically aid the flame retardant properties of phosphorus containing molecules. The cross-linked network is a large molecular weight polymer with low melt viscosity. The additional bonds between chains formed during crosslinking have to be broken before stepwise degradation of chain occurs during pyrolysis. Crosslinking also increases melt viscosity of the molten polymer in the combustion zone, thereby lowering the rate of transport of the combustible pyrolysis products (flammable gases) to the flame. While melamine is discussed, urea, guanidine carbonate, melamine cyanurate, melamine formaldehyde, melamine phosphate, melamine poly, or other materials also may be used.

In another embodiment, crosslinking can be brought about between merging melt fronts such as those encountered in bicomponent fibers. These fibers are made by mixing two dissimilar materials in the spinneret head to create fibers with two different materials joined together in different shapes. Both fibers are functionalized with functional groups that are complementary. This technique can be exploited to create cross-linked fibers. In one example, two streams of PET polymer melts, one containing a nylon resin sold under the trade name ELVAMIDE® (manufactured by DuPont) and the other containing a bifunctional crosslinker such as diglycidyl ether of polyethylene glycol (PEG) are brought together. When the melt fronts meet, the reactive molecules react with one another forming crosslinks where the melt fronts meet resulting in enhanced resistance to melt dripping in the case of a fire. The bicomponent fibers could also be made of two different melt streams. For example one may be nylon and the other may be PET. The PET part can contain a polyanhydride or a bifunctional crosslinker such as diglycidyl ether of PEG while the nylon part can contain no additives or low molecular weight nylon analogues such as hexamethylenetetramine (HMTA), triethylenetetramine (TETA), tetraethylenepentamine (TEPA), or pentaethylenehexamine (PEHA). When the PET and nylon melts are brought together, the crosslinking occurs between the amines and the anhydrides (or the epoxy) creating an interpenetrating network that inhibits melt dripping.

In another embodiment, a two or multilayer fabric or dual/multifiber fabric is used. One of the layers is a fiber that melts at a lower temperature and this melt envelopes the second fiber (a polyamide) and/or the whole fabric. The low melting point fiber has a reactive crosslinker such as epoxy modified 9,10-dihydro-9-oxy-10-phosphaphenanthrene-10-oxide (DOPO) that has been melt blended during the production of the fiber. When the lower melting point fiber melts during a flame/fire event and envelopes the other fibers/fabric, the reactive flame retardant then crosslinks the melt fronts of the nylon fibers (exposed to the same flame/fire). This crosslinker then drives the crosslinking of the two fibers.

In another embodiment, particles bearing complimentary functional groups can be added to the fibers during melt processing. For example, surface modified silica or silicon nanoparticles could be added during fiber spinning. A first nylon fiber may contain silica nanoparticles that have been modified with hydroxyl functional groups and a second nylon fiber may contain silicon nanoparticles surface modified with epoxy functional groups. These two fibers are then woven together in various form factors and patterns known in the art. When such a fabric is exposed to flame, a reaction in the melt phase is initiated between the complementary functional groups present on the surface of the silicon nanoparticles thereby creating a cross-linked network of particles which should enhance the melt viscosity and reduce dripping.

Besides silica or silicon, these particles also may be $TiO_2$, precipitated calcium carbonate (PCC), ground calcium carbonate (GCC), fibrous fillers such as carbon fibers, glass fibers, graphene, carbon black, clay, mineral fillers, metallic particles such as aluminum, ferrous particles, or other materials with complementary functional groups. The particle loadings can be in the range of less than about 1% for high aspect ratio fillers such as graphene and clay to from about 40% to about 50% loading for fillers such as silica, glass fibers, and carbon black.

Particles with functional additives disclosed herein can be added at from approximately 1% to 50% weight of the fabric or fiber, including all values and ranges there between. Reactive molecules disclosed herein can be added at from approximately 1% to 10% weight of the polymer or fiber, including all values and ranges there between.

Weaving or knitting techniques capable of producing the fabric with improved melt dripping properties can be used.

The invention also concerns compositions, articles, and methods related to benign and non-toxic flame retardants in which the flame retardant molecules or particles are anchored to a polymer matrix of an article or finished product, and are stably and uniformly distributed therein. In an aspect, phosphorus containing chemicals are effective flame retardants and are used to replace brominated compounds due to the environmental concerns associated with the brominated compounds.

The compositions may include one or more phosphorous based flame retardant molecules reacted with one or more anchors, such as, oligomeric or polymeric chains having a reactive functional group, such as an epoxy functional group, a hydroxyl functional group, an anhydride functional group, a carboxyl functional group, a sulfhydryl functional group, an ester functional group, an ether functional group, and other functional groups of the type, or combinations thereof, contained therein, forming a modified flame retardant or conjugate. The modified flame retardant may be incorporated into a polymer matrix, via bonding or physical entanglement, and used to impart flame retardant properties to a final products, such as paints, textiles, coatings, and other articles.

A method of anchoring flame retardant molecules to a polymer matrix is described with reference to FIG. 1. As illustrated, phosphorous based flame retardants are reacted with anchors, for example, oligomeric or polymeric chains, containing functional groups that are reactive towards the flame retardants, illustrated as block 102. This reaction results in flame retardants that are modified with polymer chains or anchors, illustrated as block 104. The modified flame retardants may then be mixed with a polymer matrix of an article, such as a thermoplastic, textile, and/or coating, illustrated as block 106, to provide a final product with flame retardant properties, illustrated as block 108. The anchors allow for increased dispersion of the flame retardant within the polymer matrix of the article, and also enable high loadings, for example up to about 40%, without adversely impacting the mechanical properties of the article due to bonding or physical entanglement of the anchor or tail with the polymer matrix of the article.

For example, a phosphorous flame retardant, DOPO (9,10-dihydro-9-oxa-10-phosphaphenanthrene-10-oxide) can be reacted with anchors containing an epoxy functional group using amines as catalysts. A phosphorous flame retardant, such as DOPO, modified with epoxy functional groups can be reacted with molecules containing amine groups or anhydride groups. A phosphorous flame retardant, such as DOPO, can be hydrolized to provide a hydroxyl functionality which can be further reacted with an isocyanate functional group. Similarly, a phosphorous flame retardant, FYROL PMP (1,3-phenylene methylphosphonate, distributed by ICL-IP America, Inc.), can be reacted with isocyanate groups and effectively incorporated in foams made of urethane polymers.

Figure 2:
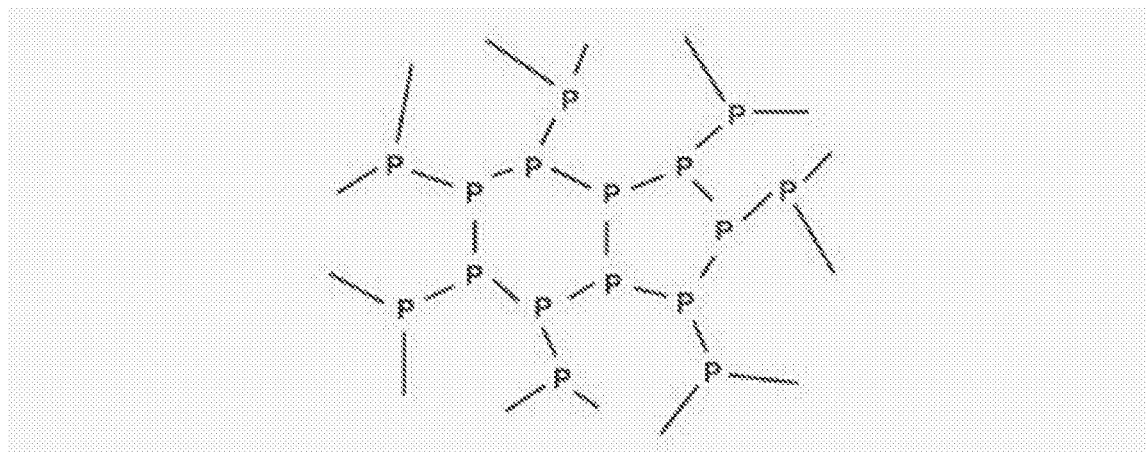
FIG. 2 illustrates the structure of red phosphorous.
Figure 3:
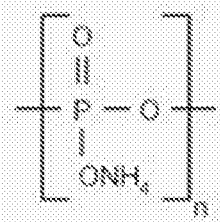
FIG. 3 illustrates the structure of ammonium polyphosphate.
Figure 4:
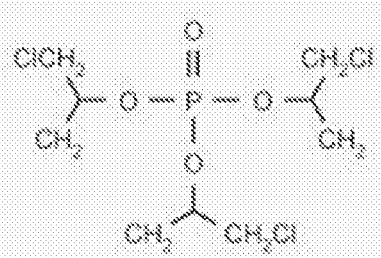
FIG. 4 illustrates the structure of trischloropropyl phosphate (TCCP).
Figure 5:
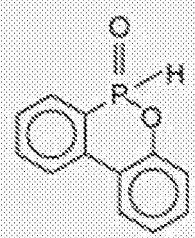
FIG. 5 illustrates the structure of DOPO (9,10-dihydro-9-oxa-10-phosphaphenanthrene-10-oxide).
Figure 6:
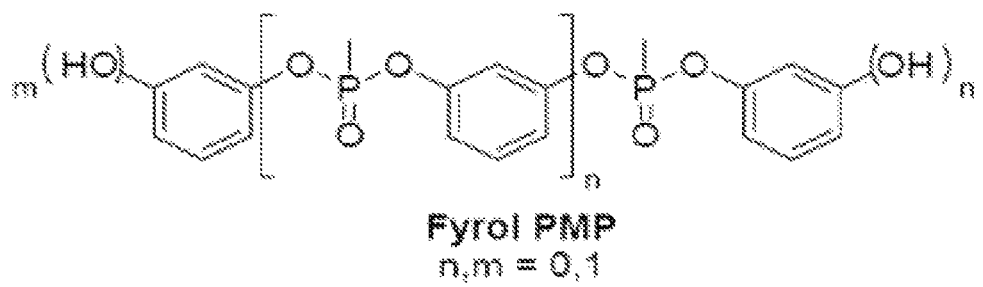
FIG. 6 illustrates the structure of 1,3-phenylene methylphosphonate.

Some examples of phosphorous based flame retardants that may be used include, for example, but are not limited to, red phosphorous (illustrated in FIG. 2), ammonium polyphosphate (illustrated in FIG. 3), Trischloropropyl phosphate (TCCP) (illustrated in FIG. 4), DOPO (illustrated in FIG. 5), and Fyrol PMP (illustrated in FIG. 6), other phosphorous based flame retardants, and combinations thereof.

The anchors or anchor molecules are generally oligomers or polymers that may be attached via covalent, electrostatic or van der Waals interactions to the phosphorus based flame retardants. Typically, the anchor molecules are selected to be made of substantially similar molecules as the polymer matrix of the article, and/or compatible with the polymer matrix of the article. There are many commercial molecules that may be used as the anchor. For example, anhydride modified or amine modified molecules can be reacted with epoxy functionalized flame retardants. Amine modified polymers, such as aminated silicones or amine modified polypropylene glycol may be used as an anchor. Other anchors include carboxyl modified anchors, and the P—H reactive group in DOPO makes it reactive with epoxy functional groups thereby allowing epoxy modified anchor molecules to be used as anchors. The anchors may also be multifunctional, enabling a reaction with a flame retardant and having other functional groups available for reacting with other entities.

The aliphatic flame retardants with suitable anchors may be used with polymer matricies, for example, including, but not limited to, aliphatic polymers such as polyethylene, popypropylene, acrylates, elastomers, aliphatic polyesters and polyurethanes, acetals (polyoxymethylene), polyamides, and combinations thereof as well as other polymers disclosed herein. Similarly, aromatic flame retardants with suitable anchors may be used with polymer matricies, for example, including, but not limited to, polyesters, styrenic polymers such as polystyrene, ABS, styrene butadiene rubbers and combinations thereof as well as other polymers disclosed herein.

Figure 7:
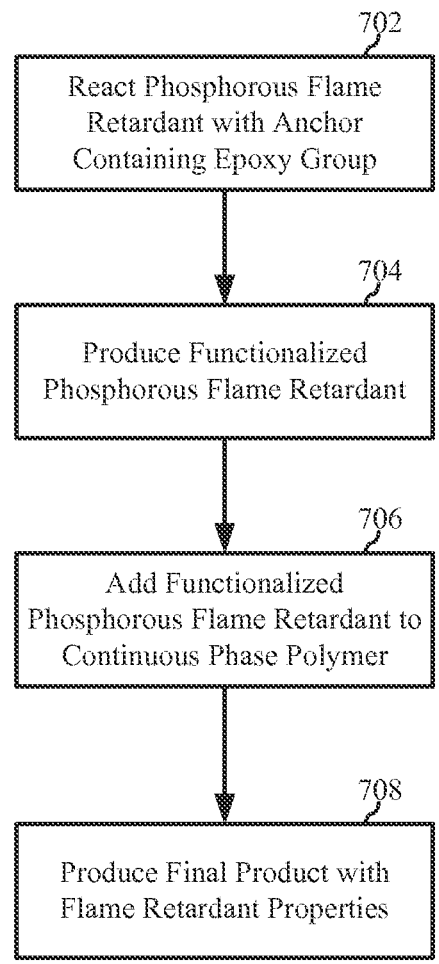
FIG. 7 illustrates a method of reacting a flame retardant with an anchor containing an epoxy functional group.
Figure 8:
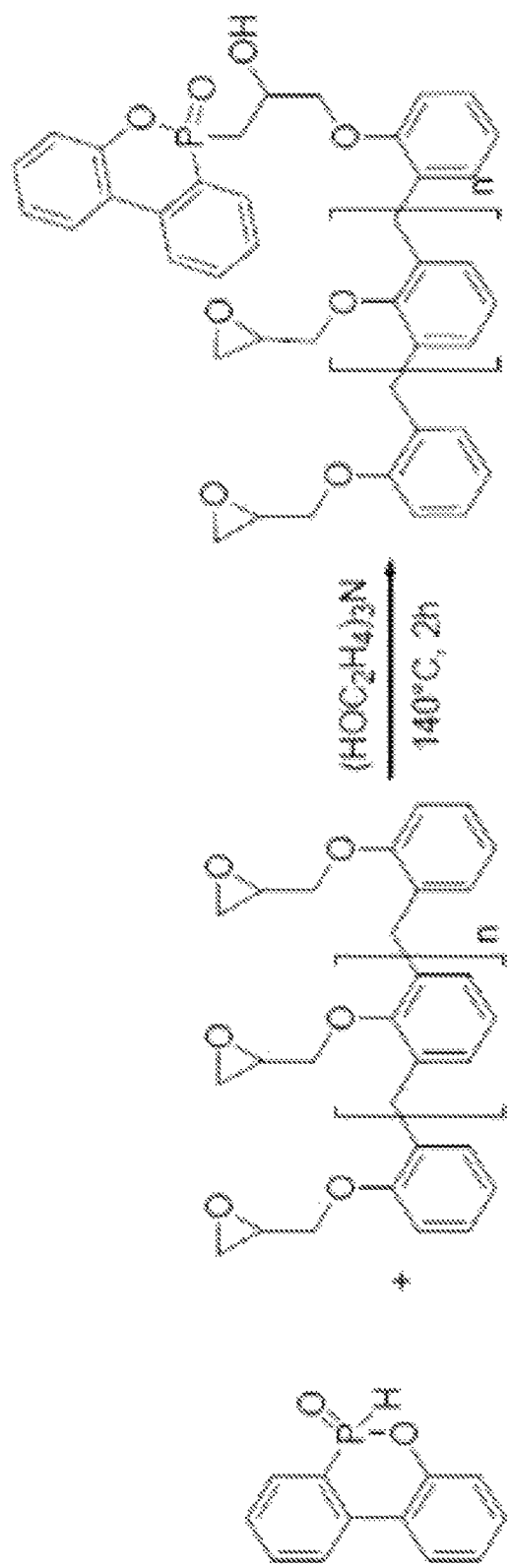
FIG. 8 illustrates a representative reaction of DOPO with an epoxy functional group.

A method of reacting a flame retardant with an anchor containing an epoxy functional group is described with reference to FIG. 7. As illustrated, a phosphorous flame retardant, such as DOPO, is reacted with an anchor containing an epoxy functional group using amines as catalysts, illustrated as block 702, to produce a functionalized phosphorous flame retardant, illustrated as block 704. For example, DOPO (9,10-dihydro-9-oxa-10-phosphaphenanthrene-10-oxide (3,4,5,6-dibenzo-1,2-oxaphosphane-2-oxide)), a reactive molecule containing 14.3% by weight Phosphorus may be reacted with epoxy modified polypropylene glycol diglycidyl ether using an amine as a catalyst. A representative reaction of DOPO with an epoxy functional group is illustrated in FIG. 8. Typical reactions include dry-blending stoichiometric ratios of DOPO with polypropylene glycol diglycidyl at high temperatures or reacting them at high temperatures in high boiling point solvents. The functionalized phosphorous flame retardant, such as functionalized DOPO-polypropylene glycol diglycidyl ether, may then be added to a continuous phase polymer, illustrated as block 706, and used to form typical products and articles, illustrated as block 708.

Figure 9:
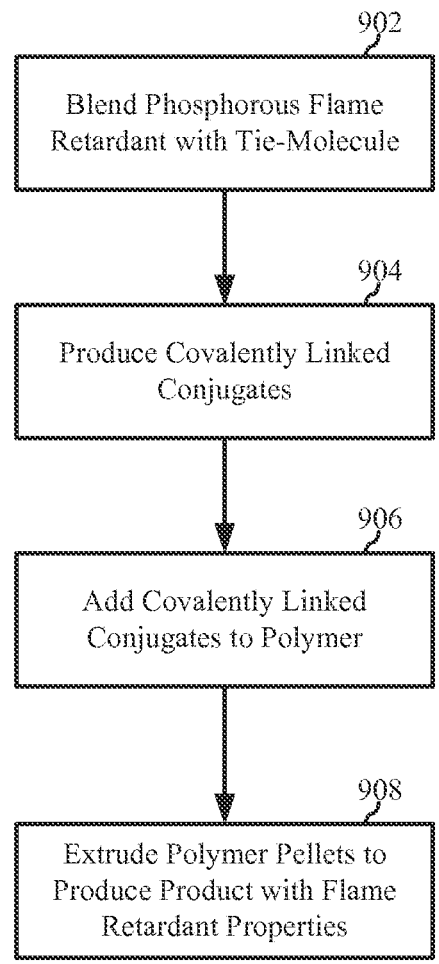
FIG. 9 illustrates a method of reacting a flame retardant with a tie-molecule.

A tie-molecule may also be used as an anchor. A method of reacting a flame retardant with a tie-molecule is described with reference to FIG. 9. As illustrated, a tie-molecule, such as a DuPont Fusabond® material (which includes modified ethylene acrylate carbon monoxide terpolymers, ethylene vinyl acetates (EVAs), polyethylenes, metallocene polyethylenes, ethylene propylene rubbers and polypropylenes) is blended with a phosphorus flame retardant, illustrated as block 902. The tie-molecules can be blended, in master batches, with the phosphorus flame retardants in an extruder at high temperature, optionally with a catalyst, to create covalently linked conjugates, illustrated as block 904. The conjugated phosphorus molecules can then be metered into traditional polymer processing equipment in master batches, illustrated as block 906, and pellets can be extruded by mixing the phosphorus-polymer conjugates with small amounts of the polymer matrix to yield a highly concentrated anchored flame retardant material, illustrated as block 908.

In an embodiment, nanoparticles are combined with phosphorus containing materials to produce flame retardant materials. For example, graphene nanoparticles have a large surface area, and can be combined with phosphorus compounds to produce phosphorous-modified graphene. Other nanoparticles may also be modified or functionalized in a similar manner, including but not limited to, graphite, graphene, graphene oxide, and other nanoparticles.

The compositions may include one or more phosphorous based flame retardant molecules reacted with one or more nanoparticles, such as, graphene, having a reactive functional group, such as an epoxy functional group, a hydroxyl functional group, or combinations thereof, contained therein, forming a functionalized nanoparticle. The functionalized nanoparticle may be incorporated into a polymer matrix and used to impart flame retardant properties to a final products, such as paints, textiles, coatings, and other articles.

Traditionally, phosphorus based flame retardants are added to a polymer in the range of about 20 to about 60% by weight of the polymer. However, this amount can cause interference with the inherent properties of the polymer, such as the mechanical strength, glass transition temperature (Tg), and water uptake.

In order to address this issue, a functionalized- or non-functionalized-graphene is used to produce a flame resistant molded article. This produces an effective flame retardant that can be used at low loading, for example as low as about 1%, that maintains and can even enhance the properties of the polymer article. Graphene particles have high strength and surface area, and can achieve a percolation threshold at lower loading dosages due to the smaller size of the graphene particles.

Figure 10:
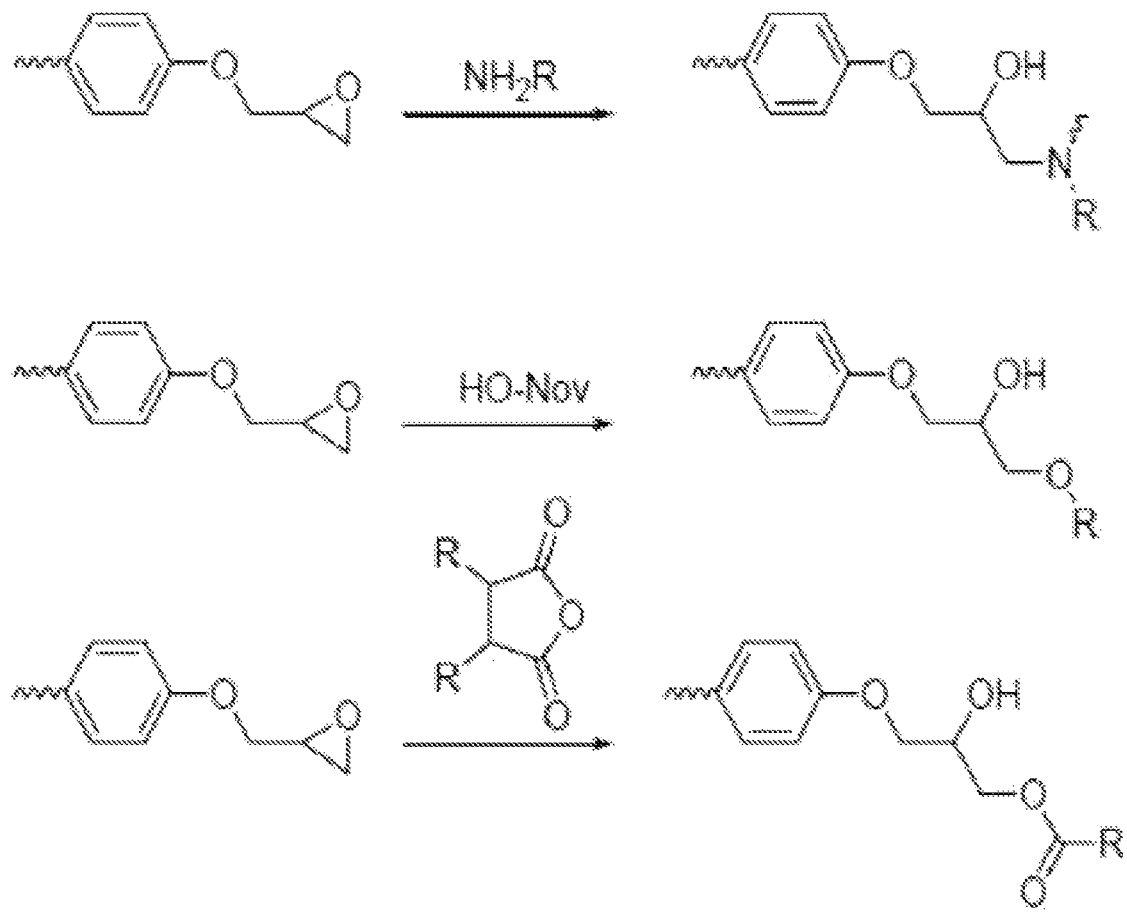
FIG. 10 illustrates a schematic of exemplary reactions of epoxy functional groups with amine functional groups.

In an example, unreduced graphene, containing epoxy and hydroxyl (OH) functional groups, functionalized with phosphorus containing materials may be used as an inclusion phase in flame retardant, composite materials that retain their inherent physical properties. The presence of epoxy groups allows for reactions with amines, anhydrides and phenol (hydroxyl) to covalently immobilize various molecules, including flame retardant molecules, containing these groups. A schematic of exemplary reactions is illustrated in FIG. 10.

Figure 11:
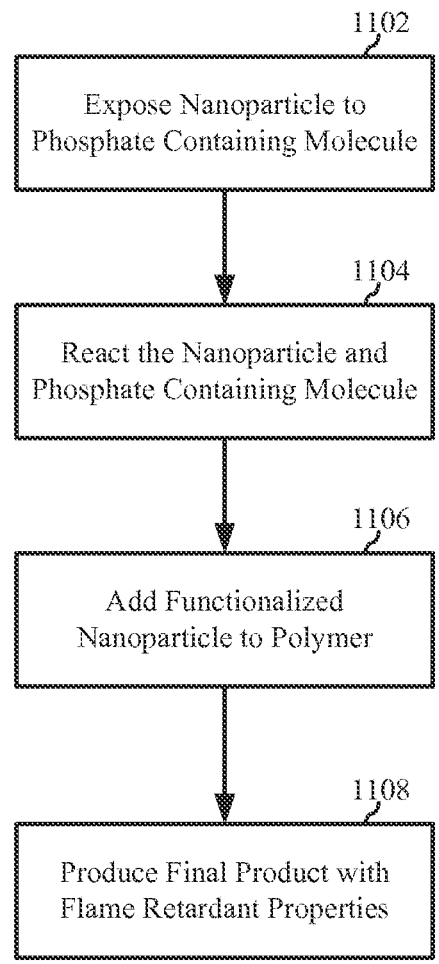
FIG. 11 illustrates a method of functionalization 5 of nanoparticles.

A method of functionalization of nanoparticles is described with reference to FIG. 11. In general, the nanoparticles are exposed to phosphate containing molecules, illustrated as block 1102. The nanoparticles and phosphate containing molecules are reacted, for example, at high temperature, illustrated as block 1104, forming a functionalized nanoparticle. The functionalized nanoparticle may then be added to a polymer matrix, illustrated as block 1106, and used to create a final product with flame retardant properties, illustrated as block 1108.

In an example, phosphate functionalization is performed by exposing nanoparticles, for example, graphene or graphene oxide, to phosphoric acid or methylphosphonic acid (or 2-carboxyl ethyl phenyl phosphinic acid) under nonoxidizing high temperature environments. Typically, phosphoric acid or methylphosphonic acid (or 2-carboxyl ethyl phenyl phosphinic acid) under solutions in water are mixed with the particles at about 0.1 to about 10% by weight, more particularly about 1% by weight, and dried to remove water in an oven at about 110° C. The mixture is placed in a furnace at about 800° C. to facilitate reaction between graphene and phosphate or phosphonate functionalities. Typically, the unbound phosphate or phosphonate moieties are dislodged from the graphene surface at high temperatures (for example, greater than about 700° C.) while carbon bound phosphorus remains stable.

In an example, unreduced graphene (graphene oxide) particles can be reacted with 2-carboxyl ethyl (phenyl) phosphinic acid in presence of a polymer melt as a binder.

The reaction between the epoxy or hydroxyl on the graphene oxide particles can react with carboxy functional group in the organophosphorus molecule. The polymer binder may (such as polyamide, polyester) or may not (polyolefins, vinyl polymers) be reactive towards 2-carboxyl ethyl (phenyl) phosphinic acid.

In one example, phosphate functionalized graphite stack particles are disclosed. In this example, the phosphate functionalized graphite stack particles are produced by adding a 10% polyphosphoric acid to graphene particles at about 1% by weight. The mixture is enclosed in a glass container and sealed and placed in a furnace at about 500° C. The atmosphere in the furnace may be controlled to be non-oxidizing by using argon. After about 4 hours, the particle slurry is washed in water to remove unreacted phosphoric acid and re-suspended in water or dried for further use.

Figure 12:
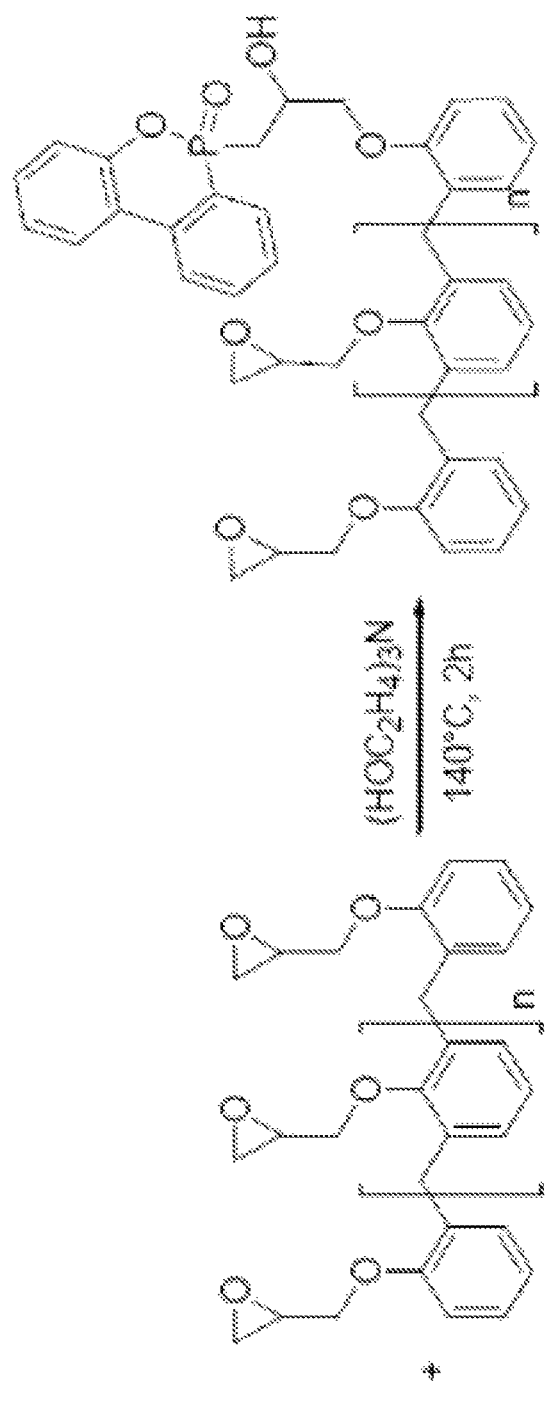
FIG. 12 illustrates a representative reaction of DOPO with an epoxy functional group.

In another example, graphene (graphene oxide) functionalized with DOPO is disclosed. In this example, DOPO (9,10-dihydro-9-oxa-10-phosphaphenanthrene-10-oxide (3,4,5,6-dibenzo-1,2-oxaphosphane-2-oxide)), a reactive molecule containing about 14.3% by weight phosphorus is used as a functionalizing agent to impart graphene with a flame retardant property. A representative reaction of DOPO with an epoxy functional group is illustrated in FIG. 12.

Typical reactions include either dry-blending stoichiometric ratio of DOPO with graphene (graphene oxide) at high temperatures or reacting them at high temperatures in high boiling point solvents. The functionalized DOPO-graphene can be added to a continuous phase polymer and used to form typical products.

In another example, graphene functionalized with AMPA is disclosed. In this example, aminomethylphosphonic acid (AMPA) provides another way to functionalize epoxy groups on un-reduced graphene with the phosphonate functionality. The amine-epoxy reaction (examples illustrated in FIG. 10) is well known and carried out in dry form or in aprotic solvent conditions at elevated temperatures.

In another example, graphene functionalized with Methylphosphonic Acid is disclosed. Typically, methylphosphonic acid solutions in water are intimately mixed with the particles at about 0.1 to 10% by weight, more particularly about 1% by weight, and dried to remove water in an oven at about 110° C. The mixture is placed in a furnace at about 800° C. to facilitate reaction between graphene and phosphate or phosphonate functionalities. The unbound phosphate or phosphonate moieties are dislodged from the graphene surface at high temperatures (for example, greater than about 700° C.) while carbon bound phosphorus remains stable.

In another example, graphene functionalized with Fyrol PMP polymer is disclosed. Fyrol PMP (1,3, phenylene methylphosphonate) is a bifunctional crosslinking agent used to cure epoxy compounds, which imparts phosphonate functionality to the epoxy backbone cross-linked structure. In an embodiment, amine functionalized graphene is mixed with an about 1% solution of Fyrol PMP in MEK or acetone and sonicated for about 15 minutes. A small amount of di-epoxy cross-linker, such as, PEG-diglycidylether, diglycidylether, and/or bisphenol A, is added at about 1% by weight of the graphene. The reaction is allowed to proceed in the presence of a base catalyst, such as, 2-methylimidazole. The reaction results in one or more of the amines being functionalized with an epoxy crosslinker, and the other end of the crosslinker being reacted with the phosphonate group of PMP. The unreacted PMP and epoxy crosslinkers are washed out with MEK and acetone, and the graphene is recovered and dried. The amine-epoxy and phosphonateepoxy reaction results in Fyrol PMP being bound to graphene.

In another example, graphene functionalized with VPA and VPADME is disclosed. Vinylphosphonic acid (VPA) or its dimethylester (VPADME) may be used as a compatibilizer between graphene and a polymer matrix. In this example, the graphene is functionalized with amine polymers, such as, polyvinylamine and/or chitosan, to include one or more primary amine functional groups. There is a strong affinity between phosphate functionalities and amine groups. The amine modified graphene is further modified with Phosphorous groups of VPA or/and VPADME by suspending the amine-graphene in VPA or VPADME solutions. VPA and VPADME impart flame retardant properties to polymers containing them owing to very high phosphorus content (for example, VPA includes about 29% by weight phosphorus and VPADME includes about 23% by weight phosphorus).

In yet another example, graphene functionalized with epoxy functionalized phosphonates is disclosed. Epoxy functionalized phosphonate containing compounds, such as, epoxydimthylphosphonate, can be used to functionalize amine functionalized graphene. Chitosan modified and/or polyvinylamine modified graphene may be reacted with a 1% solution of epoxydimthylphosphonate in an aprotic solvent at elevated temperatures to produce phosphonate functionalized graphene.

In an embodiment, macromolecules or anchor molecules are deposited onto the surface of the nanoparticles, such as, exfoliated graphite, graphene, and/or graphene oxide, to enable the nanoparticles to be mixed in suitable polymer matrices without significant agglomeration. This allows the particles to be incorporated into a polymer matrix in a homogeneous fashion.

In general, polymer composites use the concept of masterbatches in which a very high concentration of an additive is mixed with a small quantity of the polymer to create particles that are easily miscible with the polymer matrix when added during polymer processing. However, the highly adhesive nature of the intermolecular forces between nanoparticles makes it difficult to prevent stacking of such particles. The depositing of the macromolecules onto the surface of the nanoparticles allows the nanoparticles to be incorporated into a polymer matrix while avoiding stacking concerns.

In an embodiment, conjugates and bio-conjugates of graphene and macromolecules may be deposited onto the surface of the nanoparticles. The resultant conjugated-nanoparticles have a hydrophobic characteristics that results in minimal agglomeration once incorporated in suitable polymer matrices. In other embodiments, the surface functionalization using the conjugates can be performed to provide cationic groups, hydrophilic groups, and/or groups that can chelate specific metals to make them miscible in a polymer/metal composite system. The macromolecule-graphene conjugates may be dispersed in a continuous phase polymer.

These multi-component composite structures result in superior properties when compared to the individual phases alone, including, but not limited to, increased conductivity, strength, toughness, and elasticity.

Figure 13:
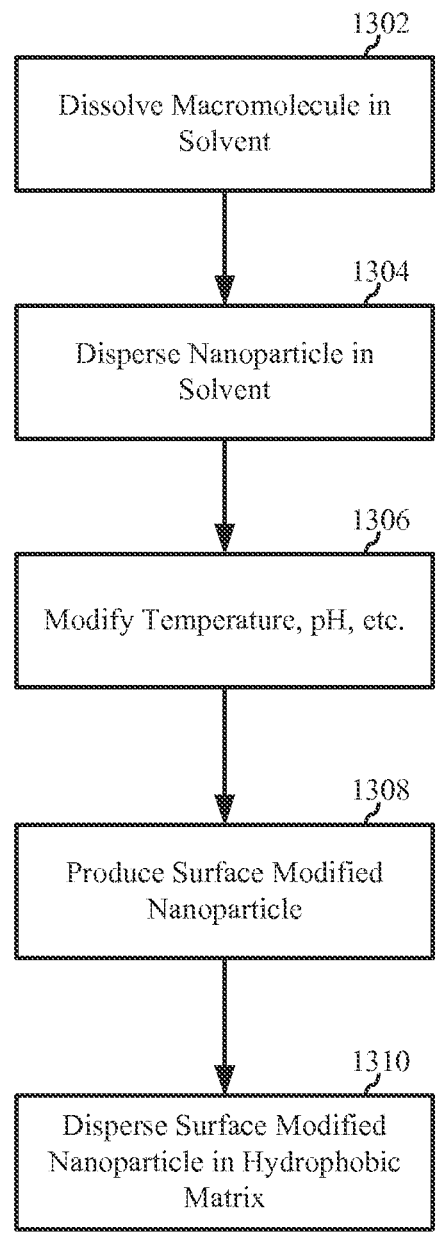
FIG. 13 illustrates a method of modification of nanoparticles using macromolecules that have variable solubility in a given solvent.

A method of modification of nanoparticles using macromolecules that have variable solubility in a given solvent is described with reference to FIG. 13. The macromolecule is dissolved in a solvent (such as, water) under allowable conditions, illustrated as block 1302. The conditions that determine solubility include, but are not limited to, temperature, pH, etc. The nanoparticle is homogeneously dispersed in the solvent, illustrated as block 1304. The conditions are then modified to decrease solubility of the macromolecule, illustrated as block 1306, resulting in a surface modified nanoparticle, illustrated as block 1308.

The macromolecule modified-nanoparticles can be readily dispersed in hydrophobic matrices, illustrated as block 1310. Using techniques known in the art, modified-nanoparticles can be used as an inclusion phase when dispersed in hydrophobic solvents. The nanoparticles retain their superior physical and chemical properties, imparting them to the composite structure. Such properties include enhanced physical and electric properties.

In an example, dispersed hydrophilic nanoparticles can be surface modified in water with a monolayer of styrene maleimide (SMAI) using a pH change in the solution. As SMAI polymers are water soluble at high pH and insoluble below their isoelectric point, the pH change can be used to deposit SMAI on water dispersible nanoparticles. Upon deposition, the particles with the individual SMAI coating agglomerate and can be filtered from the solution. Such agglomerates do not revert back to stacked nanosheets as the SMAI layer acts as a spacer. When such hydrophobically modified particles are added to polymer matrices, dispersability becomes easier and the hydrophobic styrene part of SMAI enables good interfacial strength with the hydrophobic matrix (particularly with matrices containing styrenic polymers such as polystyrene, acrylonitrile butadiene styrene, styrene butadiene etc.).

In another example, zein, a hydrophobic non-edible protein from soy can be used to modify the surfaces of hydrophilic nanoparticles. Zein is soluble in high pH while insoluble in pH below its isoelectric point. Zein leaves a hydrophobic layer on the surface of the nanoparticles leading to easy dispersability in a hydrophobic matrix. Other proteins exhibiting isoelectric point based solubility such as casein may also be used.

In another example, chitosan, a naturally occurring polymer found in the shells of sea animals, can be used to modify the surfaces of nanoparticles. Chitosan can be dissolved in an acidic aqueous solution, and precipitates in alkaline aqueous solutions. Nano particles dispersed in chitosan can then be coated with a thin precipitated layer of chitosan by simply changing the pH of the solution to an alkaline one.

In another example, a series of polymers developed by derivatizing polyvinylamine using epoxidized reactive side chains can be used to modify the surfaces of nanoparticles. The backbone polymer is soluble in water but the solubility can be altered by modifying the primary amine groups along the backbone. The altered solubility can be modulated by pH change or by temperature. By grafting hydrophobic sidechains, the solubility limit can be tuned as a function of pH while adding sidechains, which have temperature sensitive solubility (such as LCST polymer, e.g. PEO, PPO and their copolymers). By changing the solubility of these polymers, the polymers can be precipitated onto graphene oxide particles in water, thereby imparting different surface functionalities. The reactive side chains may be chosen to be compatible with the polymer matrix to which modified graphene oxide particles are added.

Other examples may include the use of amine modified graphene or graphene oxide to functionalize with phosphate groups by reactions with phosphoric acid or polyphosphoric acid. The inherent epoxy groups present on the surface of graphene oxide may also be used to react with epoxy-reactive phosphate containing molecules such as those available from Struktol®.

The invention is by the following experimental examples which are not intended to be limiting in nature.

Experimental Example 1

Chitosan surface modification of graphene oxide particles: Graphene oxide particles at about 1% by weight are suspended in a 0.01% solution of Chitosan CG110 made by dissolving Chitosan in acidic water of less than about pH 4 overnight under agitation. The pH of the suspension is raised to greater than about pH 7.5 using dilute NaOH solution under agitation to precipitate chitosan on the graphene oxide particles. The suspension is filtered and/or centrifuged to recover the modified particles. The particles are then dried before use.

Experimental Example 2

Surface modification of graphene oxide particles using imidized SMA resins: Graphene oxide particles at about 1% weight are suspended in a 0.01% solution of SMA3000I (Sartomer, Exton Pa.) made by dissolving imidized styrene maleic anhydride resin in acidic water of about pH 4 overnight under agitation. The pH of the suspension was increased slowly to about pH 8 using dilute NaOH under agitation to precipitate imidized styrene maleic anhydride on the graphene oxide particles. The suspension is either filtered and/or centrifuged to recover the modified particles. The particles are then dried before use.

Experimental Example 3

Derivatizing polyvinylamine using epoxidized hydrophobic side chains: Aliphatic monoglycidyl ether, such as, glycidylether of $C_8$-$C_{10}$ from CVC chemicals, is mixed with a 5% solution of polyvinylamine in acetone (Lupamin, BASF) at about a 1:10 stoichiometric ratio in a rotovap. The reaction between the epoxy and the amine is allowed to proceed overnight. The derivatized polyvinylamine is then resuspended in water for use.

Experimental Example 4

Functionalizing graphene with epoxidized polyvinylamine: The modified polyvinylamine from example 4 is dissolved in water at appropriate pH. This solution is added to a graphene or grapheneoxide particle suspension at about 1% by weight of particles. The pH is appropriately adjusted to ensure that polyvinylamine precipitates onto the graphene particle surface. The suspension is filtered and resuspended in water or dried for further use.

Experimental Example 5

Phosphate modified graphene particles: A 10% polyphosphoric acid is added to graphene particles by 1% weight and enclosed in a glass container and sealed and placed in a furnace at about 500° C. The atmosphere in the furnace is controlled to be non-oxidizing by using flowing argon. After about 4 hours, the particle slurry is washed in water to remove unreacted phosphoric acid and resuspended in water or dried for further use.

Experimental Example 6

Phosphate modified graphene particles using polyamine intermediate layer: The modified graphene (reduced or graphene oxide) with amines (chitosan or polyvnylamine) from examples 1 or 4 is reacted with polyphosphoric acid at pH 4 for about 2 hours at about 60° C. until the water is evaporated. The reaction mixture is washed with water and resuspended in water.

Experimental Example 7

Mixture of graphene and metal nanoparticles by electrostatic assembly. In one embodiment, a stream of metallic nanoparticles are treated with a cationic polymer and a stream of graphene nanoparticles are treated with anionic polymer. Both streams are mixed under high agitation to produce electrostatically assembled metal/graphene composites. Such composite slurries can be used as is to make inks or added as additives into other materials for conductivity and surface area improvement.

Experimental Example 8

Phosphate modification of graphene oxide nanoparticles: about 6 g of graphene oxide particles (with OH groups on the surface) are suspended in about 60 mL dry pyridine and sonicated for about 5 min. About 6 mL $POCl_3$ in 30 mL methylene chloride is added to the suspension. The suspension is refluxed at about 120° C. for 3 hours. The reaction mixture is washed with water, centrifuged, and re-suspended in water or dried at about 100° C. for further use.

Experimental Example 9

Phosphate modification of polyamides: An epoxy modified phosphate based molecule such as epoxy modified 9,10-dihydro-9-oxy-10-phosphaphenanthrene-10-oxide (DOPO) is dry blended with Polyamide pellets (Nylon-6 or Nylon-6,6) and added to the hopper of a twin screw extruder. The melt reaction secures the DOPO molecule to the polyamide molecule and crosslinks the polyamide molecules in the melt. By appropriately controlling the ratio of DOPO to polyamide, the crosslink density and dripping behavior can be controlled. The limit of oxygen indeed of the DOPO modified Nylon 6 is ~24 while that of unmodified Nylon is 21. The modified Nylon 6 was spun into fibers using melt spinning and knit into a sock (bandeau). The DOPO modified Nylon 6 is shown to be drip-free when tested as a fabric in the vertical flame test (ASTM D 6413) with a char length that ranges between 4"-4.3". The char length of unmodified Nylon 6 is ~5.7"-6.2"

Experimental Example 10

Phosphate modification of polyesters: An epoxy modified phosphate based molecule such as epoxy modified 9,10-dihydro-9-oxy-10-phosphaphenanthrene-10-oxide (DOPO) is dry blended with Polyester (PET) pellets and added to the hopper of a twin screw extruder. The melt reaction secures the DOPO molecule to the polyester molecule via epoxy-acid and epoxy-hydroxyl reactions and crosslinks the polyester molecules in the melt. By appropriately controlling the ratio of DOPO to polyester, the crosslink density and dripping behavior can be controlled.

In an embodiment, compositions and methods of making porous nanoparticles imbibed with flame retardant molecules are disclosed. The problem of incorporation of flame retardants in polymer matrices or in coatings at high loadings are well known. The loss in mechanical properties such as stiffness due to plasticization effects of small molecule flame retardants (particularly phosphate flame retardants) makes them unattractive in engineering applications where mechanical integrity and flame retardant properties are often highly desired. It is also well known that fillers such as glass fibers, silica particles, clay are added to strengthen polymer articles. These fillers are often integrated with the polymer matrix via surface modification of particle surface with silanes and other such molecules.

To address these issues, porous nanoparticles or micro-particles may be imbibed with solutions of the flame retardants and the solvent may then be removed thereby producing flame retardant loaded nanoparticles. These nanoparticles or micro-particles can then be added to polymer matrices or coating formulations as is or surface modified with a silane or similar molecule. These porous particles may be the entirety of the filler added or a smaller fraction of the filler.

In an embodiment, the flame retardant molecule can be solvated in a common solvent that also solubilizes the polymer matrix. In one example, a flame retardant, such as, triphenylphosphine is dissolved in acetone. The solution is then mixed with porous silica particles and then vacuum dried to produce flame retardant infused particles.

In another example, a small amount of polystyrene is co-dissolved with triphenylphosphine in acetone. This solution is then mixed with porous silica particles. The smaller molecule flame retardant diffuses into the interstices of the particle while the larger swollen polystyrene chain occupies the outside of the particle, which when dried is coated with polystyrene chains. This surface modification improves the compatibility of the particles when added to a polystyrene matrix resin during processing.

In an embodiment, compositions and methods of making flame retardant Latex particles is disclosed. Latex particles are used in paints, binders, strengthening and impact modifying additives (in cement for example). Latex particles are colloidal in nature and are prepared by emulsion polymerization of a hydrophobic monomer emulsified in a water medium (oil in water continuous phase emulsion) using surfactants. In one embodiment, a molecule that is soluble in the monomeric phase (oil) can be added, which becomes trapped inside the polymerizing latex bead in the micelle. An organic phosphorus containing molecule having flame retardant properties is one such additive. The organophosphorus additive may be combined with the monomeric phase at various loading levels to obtain fire retardant infused latex particles.

In another example, the particles may be made by suspension polymerization, where the initiator is oil soluble or monomer soluble. In yet another example, reactive monomers that contain phosphorus, such as, vinyl phosphonate, can be made to undergo emulsion copolymerization during latex production, thereby incorporating the phosphorus containing monomer within the chemical structure of the polymer making up the latex particle.

Although the compositions, articles, and methods have been described and illustrated in connection with certain embodiments, many variations and modifications will be evident to those skilled in the art and may be made without departing from the spirit and scope of the disclosure. The discourse is thus not to be limited to the precise details of methodology or construction set forth above as such variations and modification are intended to be included within the scope of the disclosure.

What is claimed:

1. A composition comprising: a plurality of nylon-based polymer fibers, wherein one or more of the nylon-based polymer fibers are melt blended with a polymer comprising the following groups:

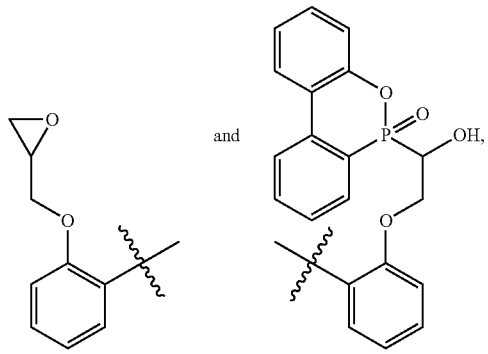 [SMILES: *c1ccccc1OCC1CO1 ; "and" ; *c1ccccc1OCC(O)P1(=O)Oc2ccccc2-c2ccccc21]

and one or more of the remaining nylon-based polymers comprise a first functional group and one or more of the remaining nylon-based polymers comprise a second functional group, the second functional group being different from and complementary to the first functional group; wherein one or more of the nylon-based polymers crosslink upon exposure to flame, and wherein the first functional group and the second functional group are selected from the following functional group combinations: amine and epoxide, amine and anhydride, amine and isocyanate, amine and aldehyde, amine and alkyl halide, amine and alkyl sulfonate, and amine and thiol.

* * * * *